(12) United States Patent
Couillard et al.

(10) Patent No.: US 9,081,795 B2
(45) Date of Patent: Jul. 14, 2015

(54) METHODS AND SYSTEMS FOR SHARING REAL-TIME ELECTRONIC CONTENT AMONG SOCIAL CONTACTS

(71) Applicant: Adobe Systems Incorporated, San Jose, CA (US)

(72) Inventors: Nic Couillard, Berkeley, CA (US); Kim Pimmel, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 277 days.

(21) Appl. No.: 13/624,447

(22) Filed: Sep. 21, 2012

(65) Prior Publication Data

US 2014/0086510 A1    Mar. 27, 2014

(51) Int. Cl.
*G06K 9/00* (2006.01)
*G06F 17/30* (2006.01)

(52) U.S. Cl.
CPC .... *G06F 17/30241* (2013.01); *G06F 17/30268* (2013.01); *G06K 9/00677* (2013.01)

(58) Field of Classification Search
USPC .................. 382/100, 305; 709/206, 227, 230
See application file for complete search history.

(56) References Cited

U.S. PATENT DOCUMENTS

| 8,386,619 B2 * | 2/2013 | Mallet et al. ................. 709/227 |
| 2013/0073623 A1 * | 3/2013 | Nguyen et al. ................ 709/204 |

* cited by examiner

*Primary Examiner* — Phuoc Tran
(74) *Attorney, Agent, or Firm* — Kilpatrick Townsend & Stockton LLP

(57) ABSTRACT

Systems and methods are discussed to share real-time electronic content among social contacts. The current location of a mobile device is determined to be at a live event. For example, GPS functionality may be used to determine the current location of the mobile device at a live event. A live event vicinity associated with the live event is determined. The live event vicinity comprises a geographic area proximate the live event. One or more social contacts may be determined to be within the live event vicinity. Electronic content may be captured using the mobile device. For example, a photograph may be taken using the mobile device. The captured electronic content may be shared with one or more social contacts that are determined to be within the live event vicinity.

22 Claims, 7 Drawing Sheets

METHODS AND SYSTEMS FOR SHARING REAL-TIME ELECTRONIC CONTENT AMONG SOCIAL CONTACTS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD

This disclosure relates generally to sharing electronic content. In particular, the present invention relates to sharing real-time electronic content among social contacts.

BACKGROUND

There are various ways to share electronic content, such as photographs and videos, among others interested in having copies of that content. Traditional methods of sharing electronic content generally require that the person capturing the electronic content send a communication to the party interested in that content. For example, a person taking photographs at a particular event may send an email to interested parties attaching the photographs. Traditional methods of sharing electronic content do not adequately enable a person capturing electronic content to easily share that content with others that are present at a particular event. For example, a person taking photographs at a concert must undergo the arduous process of identifying friends and family that either attended or didn't attend the concert that are interested having access to the photographs and emailing that photographs to those individuals.

There is also the opportunity for the individual who captured the electronic content to identify and post the electronic content to an internet based photo sharing website, such as Google's Picasa® or Yahoo's Flickr®, for family and friends to view. The individual who captured the electronic content can email a link of that content to those individuals interested in the photographs. However, there is no adequate mechanism for the individual capturing electronic content to provide the content to a group of socials contacts in attendance at the event in real-time. To that end, existing methods and applications that allow a user to send electronic content to interested parties at the time of the event are limited with respect to their intuitiveness and/or capabilities.

SUMMARY

Embodiments according to the present disclosure provide methods and systems for sharing real-time electronic content among social contacts. For example, one disclosed embodiment is a method comprising determining a current location of a mobile device at a live event; determining a live event vicinity associated with the live event and comprising a geographic area proximate the live event; determining that one or more social contacts are within the live event vicinity; capturing electronic content using the mobile device; and sharing the captured electronic content with one or more social contacts that are determined to be within the live event vicinity. In another embodiment, a computer-readable medium comprises program code for causing one or more servers to execute such a method.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
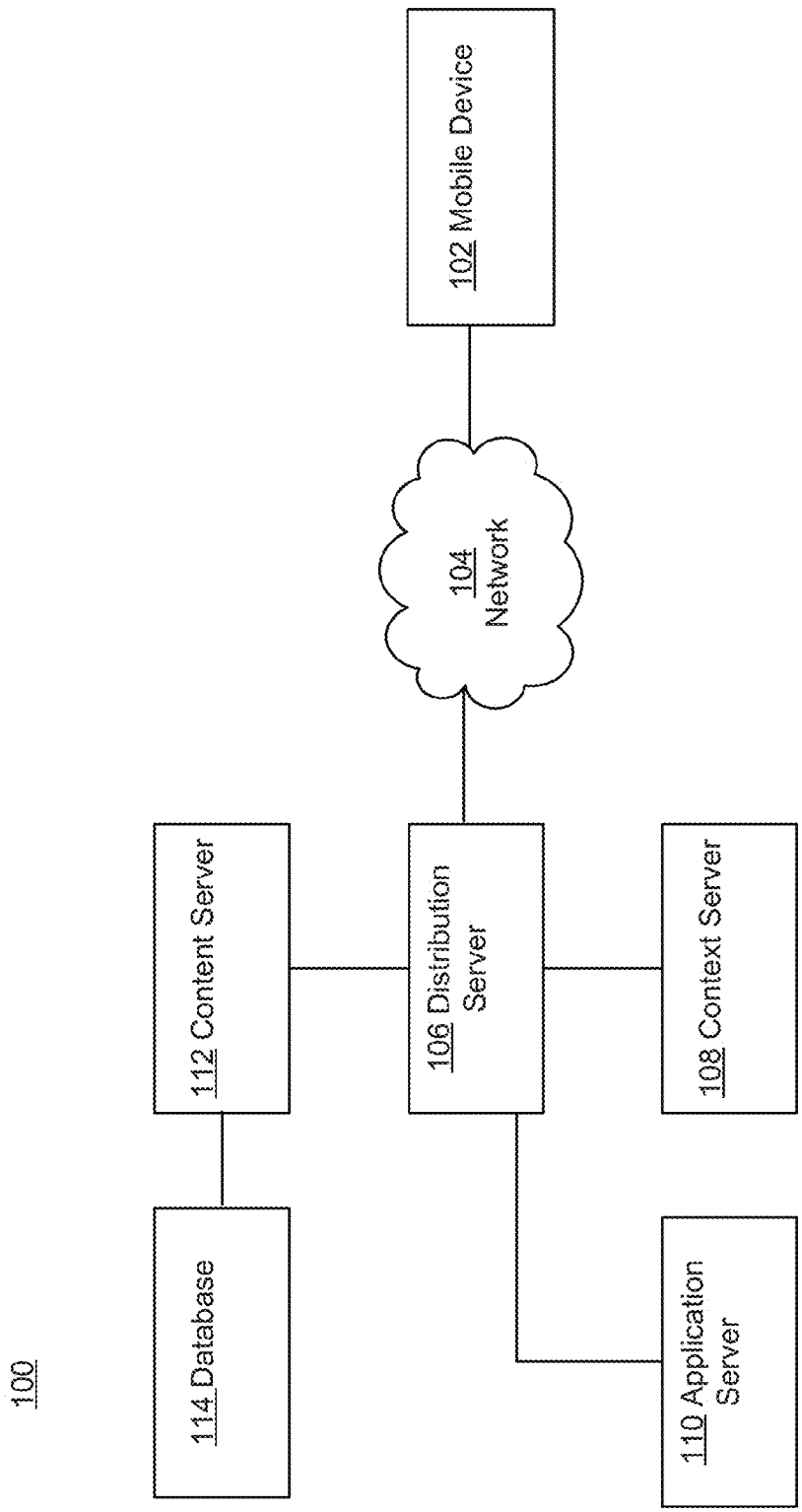
FIG. 1 is a block diagram depicting an exemplary system for implementing sharing of real-time electronic content among social contacts.

Systems and methods are disclosed to facilitate sharing real-time electronic content among social contacts. The methods and systems disclosed herein may be used in a variety of contexts and provide various advantages and features. To illustrate certain features and advantages the following discussion describes an embodiment in which captured electronic content is shared among one or more social contacts that are within a specified vicinity or geographical area of a live event. However, it will be understood by those of skill in this art that the methods and techniques may be used in other circumstances and may be modified and adjusted as appropriate to address the particular requirements presented by those circumstances.

In one exemplary embodiment, systems and methods for sharing real-time electronic content among social contacts provides a streamlined way to share electronic content between individuals having a social connection that are within a certain vicinity or geographic area of a live event. For example, electronic content captured by a mobile device user can be shared with designated social contacts attending the same event as the user shortly after the electronic content is captured.

In particular, various embodiments of systems and methods for sharing real-time electronic content provide for an environment where electronic content captured by a mobile device can be electronically and/or automatically shared with social contacts that are within a live event vicinity. The term "electronic content" is used generally herein to refer photographs, videos, audio recordings, multimedia messages, and the like. Electronic content is generally captured by using a mobile phone or other device (collectively referred to herein as a "mobile device" or "mobile terminal"). The term "live event vicinity" is used generally herein to refer to a vicinity or geographic area around a particular event. The term "event" is used herein generally to refer to any environment, gathering or occurrence that involves one or more individuals. For example, an event may be a concert, celebration, a night out (i.e. poker night), weekend trip, sporting event, pot luck, and the like.

In some embodiments, sharing real-time electronic content may be provided for by using at least mobile device technology, global positioning system technology, internet-based technology, cloud computing technology, network server technology, and software executable applications. In some embodiments, a mobile device user may interact with an application (referred to herein as a "content sharing application") to share real-time electronic content among social contacts. The content sharing application may incorporate GPS-functionality, location based functionality, electronic content capturing functionality, interactive map functionality, electronic content album creating functionality, social network creation and designation functionality, and many other features. The content sharing application may run on the user's mobile device or, alternatively or additionally, may run on another device, such as the user's desktop or laptop computer, a network server, and the like.

In some embodiments, the user may define the live event vicinity. The live event vicinity may be defined by the user interacting with the content sharing application. For example, the user may define a live event vicinity by manipulating a graphical user interface of the content sharing application displayed on the mobile device. The content sharing application may then translate the visual representation of the live event vicinity to geographic coordinates and the like. In another example, the user may define the live event vicinity by entering a distance (i.e. square footage or mileage) that represent a geographical area of the user's current location in a graphical user interface of the content sharing application.

In another example, a user may define a live event vicinity by identifying an address for an event on an interactive map and by specifying a vicinity or geographical area around that address. As another example, the user may define a live event vicinity by typing in the name of the event location in the graphical user interface of the content sharing application. Upon the content sharing application identifying the coordinates of the event location based on the name, the user specifies a vicinity or geographical area around those coordinates.

In some embodiment, another party other than the user may define the live event vicinity. For example, the organizer, sponsor or promoter of an event may define the live event vicinity of a particular event. These and other methods for defining a live event vicinity will occur to those of skill in the art.

In some embodiments, the system may determine the location of the mobile device associated with the user in a variety of different ways, such as by EPS technology, Internet-based technology, etc. The location of the mobile device associated with the user may be determined by monitoring the coordinates of the mobile device. The specific coordinates may be used to determine an address where the user is currently located.

In some embodiments, the system may compare the coordinates of the mobile device user to a live event vicinity. The live event vicinity may be stored on the system. The coordinates of the mobile device user may be compared to the live event vicinity to determine whether electronic content captured by the mobile device user should be shared with social contacts that are within that same vicinity. By way of example, the live event vicinity may be defined as being any geographical area that is within 2 miles of Phillips Arena in Atlanta, Ga. The system may determine whether the mobile device user is within 2 miles of Philips Arena and may determine whether to share photographs captured by the user with social contacts that are also within 2 miles of Phillips Arena.

In some embodiments, the system may be configured to detect and determine whether one or more of the user's social contacts are within the live event vicinity. The system may use a variety of different ways, such as by GPS technology, Internet-based technology, etc., to determine whether one or more of the user's social contacts are within the live event vicinity. The system may monitor or track the location of mobile devices associated with one or more of the social contacts to determine whether they are within the live event vicinity. The system may compare the coordinates of one or more of the user's social contacts to the coordinates of the live event vicinity to determine whether the one or more social contacts are within the live event vicinity.

In some embodiments, the mobile device is used to capture electronic content at a particular live event. The mobile device generally includes functionality that permits the mobile device to capture electronic content. For example, the user may be attending a live baseball game at Turner Field and may use a cell phone to take pictures of the baseball field and the baseball players.

In some embodiments, the system may be capable of sharing the captured electronic content with the one or more individuals that have a social connection with the user and that are within the live event vicinity. The system may identify the one or more social contacts that are capable of receiving the captured electronic content and share the captured electronic content with those contacts. The system may automatically send the captured electronic content to social contacts of the user that are within the same geographical area of the mobile device user and are designated to receive any electronic content captured by the mobile device user. For example, when the system identifies that both the user and a social contact of the user are within the live event vicinity, the system may share photographs taken by the user with that social contact immediately after the photograph is taken. The system may also delay sending captured electronic content to the one or more social contacts capable of receiving the captured electronic content. For example, the user may use the content sharing application to direct the system to delay sharing captured electronic content to those capable of receiving electronic content until the system receives an indication from the user.

In some embodiments, the mobile device user may use the content sharing application to identify social contacts that are within a certain live event vicinity. For example, the graphical user interface of the content sharing application may provide the user with a list of social contacts that are within the live event vicinity. The mobile device user may be able to review the list of contacts and select the contacts that are capable of receiving captured electronic content. The system may receive the selected list of social contacts and share captured electronic content with those individuals on the list.

These illustrative examples are given to introduce the reader to the general subject matter discussed here and are not intended to limit the scope of the disclosed concepts. The following sections describe various additional embodiments and examples with reference to the drawings in which like numerals indicate like elements.

Illustrative Devices and Systems

Referring now to the drawings in which like numerals indicate like elements throughout the several Figures, FIG. 1 is a block diagram depicting an exemplary system 100 for implementing sharing of real-time electronic content among social contacts. The exemplary system 100 may include a mobile device 102 that is in communications with one or more network servers (e.g., distribution server 106, context server 108, application server 110, content server 112) through a network 104. The network 104 may be an Internet, a Local Area Network (LAN), a Wide Area Network (WAN), a private network, a Wi-Fi, or some other suitable type of network associated topology.

The mobile device 102 is associated with a particular user. The mobile device 102 generally includes functionality that permits the mobile device 102 to capture electronic content. For example, the mobile device 102 may have a camera that is capable of taking photographs and/or capturing video. Various types of mobile devices 102 may be used. Mobile devices 102 may include, for example, a cell phone, a wireless device, a tablet computer, a personal digital assistant (PDA), a laptop computer, a camera, GPS enabled device, or any device that may be used for capturing and sharing electronic content.

The mobile device 102 may have a display that allows the user to interact with a user interface. The user may use the user interface to interact with a content sharing application that allows the user to share electronic content with social contacts that are within a live event vicinity. The user may use the user interface to capture electronic content. The user may use the user interface to define an event location. The user may use the user interface to define a live event vicinity. The user may use the user interface to identify social contacts that are within a live event vicinity. The user may use the user interface to select one or more social contacts that are within a live event vicinity. The user may use the user interface to share captured electronic content with one or more social contacts that are within the live event vicinity. The user's interactions with the user interface may be communicated to the one or more network servers.

The one or more networks servers (e.g., distribution server 106, context server 108, application server 110, content server 112) may be implemented using hardware, software firmware, manual processing, or any combination thereof. The sharing of real-time electronic content among social contacts may be implemented through one or more software modules executed by the one or more network servers, possibly in cooperation with one or more content sharing applications executed by a mobile device 102.

The distribution server 106 may be connected to the context server 108, application server 110, and content server 112. These various servers may participate in a cloud computing paradigm. These various servers may be implemented on a single computer system, or multiple computer systems. The distribution server 106 may receive information from the mobile device 102 and route the information to one or more of the servers 108, 110 and 112. In addition, the distribution server 106 may distribute information received from one or more of the servers 108, 110 and 112 to the mobile device 102. In some embodiments, the distribution server 106 may receive information from the one or more mobile devices and route the information to the one or more servers. The distribution server 106 may also distribute information received from the one or more servers to one or more mobile devices.

The context server 108 may be used to determine the current location of the mobile device 102 associated with the user. The context server 108 may determine the current location of the mobile device at a live event. The context server 108 may use location based technology, GPS technology, Internet-based technology and the like to determine the location of the user. For example, the context server 108 may monitor or track the coordinates of a mobile device 102 associated with the user. Based on the coordinates, the context server 108 may determine the location of the user. The context server 108 may receive information from the mobile device 102 to determine the current location of the mobile device 102. The context server 108 may send information to the mobile device 102 to determine the current location of the mobile device 102. In some embodiments, the context server 108 may communicate with a location based component of the mobile device 102 to determine the location of the mobile device 102 associated with the user.

In some embodiments, the context server 108 may determine the location of one or more social contacts of the user. The context server 108 may determine the location of the one or more social contacts of the user by monitoring or tracking a mobile device associated with the one or more social contacts. The context server 108 may receive information from the mobile device associated with the one or more social contacts and/or send information to the mobile device associated with the one or more social contacts to determine the current location of the one or more social contacts.

The content server 112 may receive electronic content and/or other information from the mobile device 102 over the network 104. The content server 112 may receive the electronic content from the distribution server 106 which received the electronic content from mobile device 102. The content server 112 may share electronic content and/or other information with the mobile device 102 associated with the user and/or one or more social contacts of the user. For example, the content server 112 may share photographs captured by the mobile device 102 associate with the user to a mobile device associated with one or more social contacts of the user. In some embodiments, the distribution server 108 may receive captured electronic content from the content server 112 and share the captured electronic content with the mobile device 102 or one or more of the user's social contacts within the live event vicinity. The captured electronic content may be shared with one or more of the user's social contacts in a variety of ways. The one or more social contacts may receive the captured electronic content in a photo album on their mobile device. The one or more social contacts may receive the captured electronic content in a SMS, MMS and the like.

The captured electronic content and/or other data may be stored on the content server 112. The captured electronic content may be stored in the local memory of the content server 112, which may include a RAM, hard disk, removable disks, tape arrays, or any other computer readable medium. Alternatively, or additionally, the content server 112 may have a database 114 for storing captured electronic content and/or other data. The content server 112 may store electronic content captured by the user and/or electronic content capture by one or more social contacts of the user.

The application server 110 may determine a live event vicinity. The application server 110 may access the coordinates for a live event vicinity that is associated with a live event. The live event vicinity may be stored within a local memory of the application server 110. The application server 110 may communicate with the mobile device 102 associated with the user to obtain the live event vicinity. For example, the application server 110 may receive a user defined vicinity or geographical area that is around of a particular event. In some embodiments, the application server 110 may communicate with a party other than the user or a mobile device associated with person other than the user to obtain the live event vicinity. In another embodiment, the live event vicinity may be stored on one or more of the servers. The application server 110 may communicate with the one or more servers to obtain the live event vicinity.

The application server 110 may also determine that one or more of the user's social contacts are within the live event vicinity. The application server 110 may communicate with the context server 108 or one or more of the servers to obtain the location of one or more of the user's social contacts. The application server 110 may communicate directly with a mobile device 102 or any device associated with one or more of the user's social contacts to determine their location. The application server 110 may compare the coordinates of one or more of the user's social contacts to the live event vicinity to determine whether the social contact is within the live event vicinity. The application server 110 may provide an indication to the user that one or more social contacts of the user are within the live event vicinity. The indication may state that the one or more social contacts will receive any electronic content captured by the mobile device 102 associated with the user. In some embodiments, the application server 110 may communicate a list of one or more social contacts within the live event vicinity to the mobile device 102 associated with the user.

The one or more servers 106, 108, 110 and 112 and/or the mobile device 102 may comprise a computer-readable medium such as a random access memory (RAM) coupled to a processor that executes computer-executable program instructions and/or accesses information stored in memory. Such a processor may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

Figure 2:
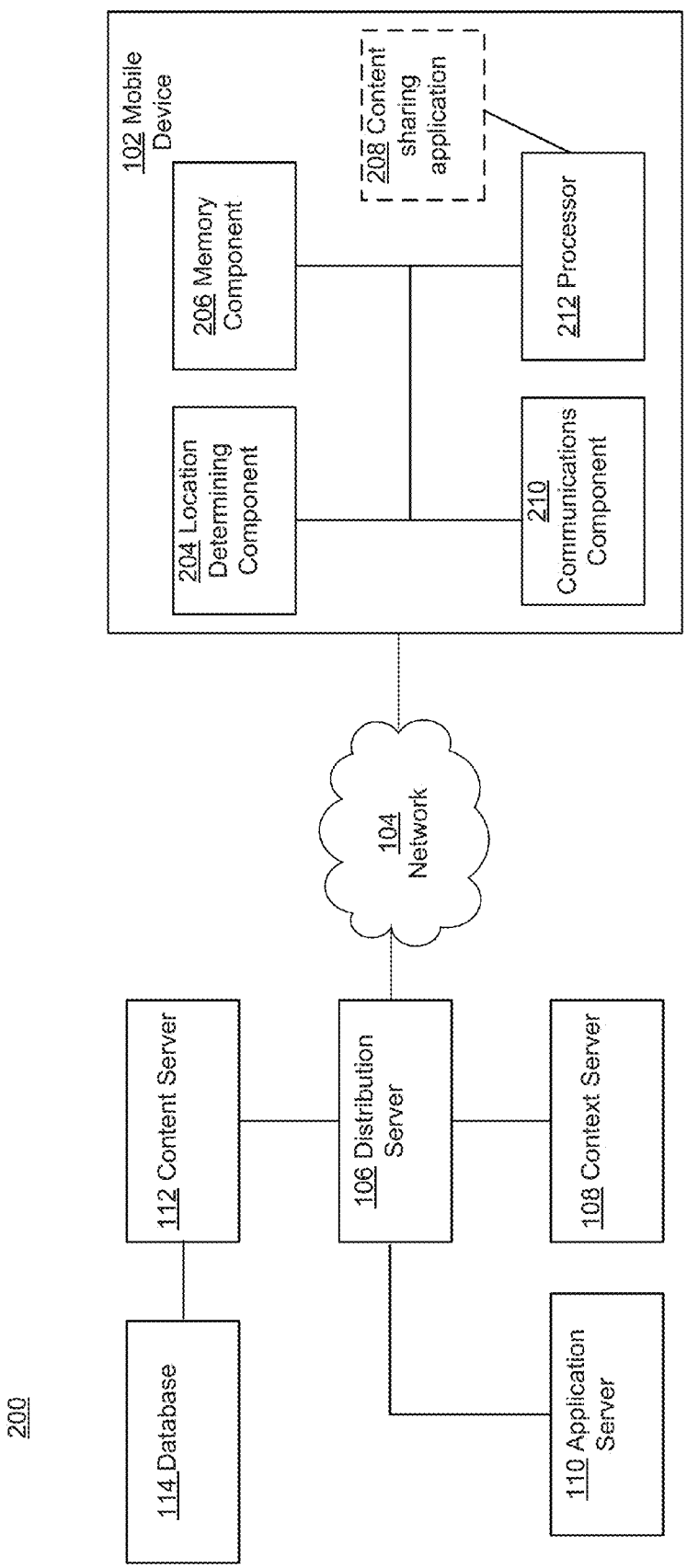
FIG. 2 is a block diagram depicting an exemplary system for implementing sharing of real-time electronic content among social contacts.

FIG. 2 is a block diagram depicting an exemplary system 200 for implementing sharing of real-time electronic content among social contacts. The exemplary system 200 illustrates details of the mobile device 102. The mobile device 102 may include a location determining component 204, a memory component 206, a communications component 210, and a processor 212.

The processor 212 may communicate with the location determining component 204, memory component 206, and communications component 210. The processor 212 may process data and execute any of a software module or a executable software program, and cause data to be stored. The operation of the processor 212 may include executing software or coded instructions that may in particular embodiments be associated with the one or more function modules.

The processor 212 may run an executable application. The executable application may be the content sharing application 208. The content sharing application 208 may be used to share electronic content with social contacts that are within a live event vicinity. The content sharing application 208 may be used to capture electronic content. The content sharing application 208 may be used to define an event location. The content sharing application 208 may be used to define a live event vicinity. The content sharing application 208 may be used to identify social contacts that are determined to be within a live event vicinity. The content sharing application 208 may be used to select one or more social contacts that are determined to be within a live event vicinity. The content sharing application 208 may be used to share captured electronic content with one or more social contacts that are determined to be within the live event vicinity.

The content sharing application 208 may function as a user interface. The content sharing application 208 may receive inputs or commands from the mobile device 102 to activate certain features or components of the mobile device 102. The content sharing application 208 may initiate and/or communicate a command from the mobile device user to operate the appropriate component. The content sharing application 208 may perform some, none, or all of the functions of the mobile device 102.

The memory 206 may be coupled to the processor 212 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

The location determining component 204 may be used to determine the location of the mobile device 102. The location determining component 204 may be used to determine the location of the mobile device 102 at a live event. The location determining component 204 may enable and/or include location based functionality (e.g. GPS technology, Internet technology) of the mobile device 102. The location determining component 204 may communicate with the one or more servers to help determine the current location of the mobile device 102. The location determining component 204 may communicate with the communications component 210, memory component 206, and processor 212 to assist in determining the current location of the mobile device 102.

The communications component 210 may be connected to the location determining component 204, memory component 206, and processor 212. The communications component 210 may receive information from the location determining component 204, memory component 206, and processor 212 and route the information to one or more of the servers 106, 108, 110 and 112. In addition, the communications component 210 may receive information from the one or more servers 106, 108, 110 and 112 and route the information to the location determining component 204, memory component 206, and processor 212.

Figure 3:
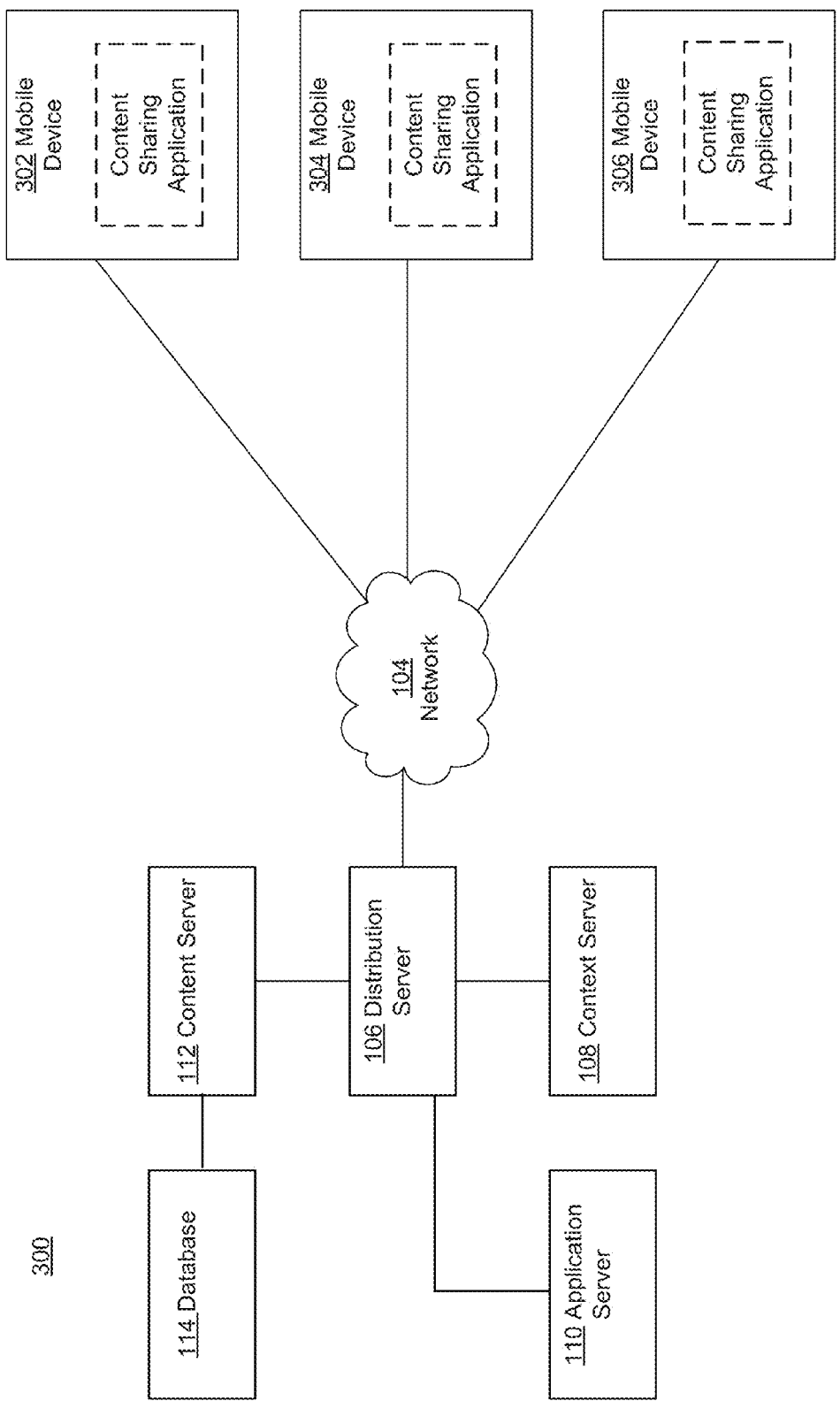
FIG. 3 is a block diagram depicting an exemplary system for implementing sharing of real-time electronic content among social contacts.

FIG. 3 is a block diagram depicting an exemplary system 300 for implementing sharing of real-time electronic content among social contacts. As illustrated, the exemplary system 300 may include mobile devices 302, 304 and 306 that are in communications with one or more network servers (e.g., distribution server 106, context server 108, application server 110) through a network 104 (e.g. the Internet or a private network, etc.). In this embodiment, each of the mobile devices 302, 304 and 306 is associated with an individual. The mobile device 302 is associated with a particular user and mobile devices 304 and 306 are associated with one or more social contacts of the user that are determined to be within a live event vicinity. The mobile devices 302, 304 and 306 may share captured electronic content among each other. As discussed above, electronic content captured by one or more mobile devices can be shared among the user and one or more social contacts of the user that are within a live event vicinity. The captured electronic content may be stored in a shared photo album.

Figure 4:
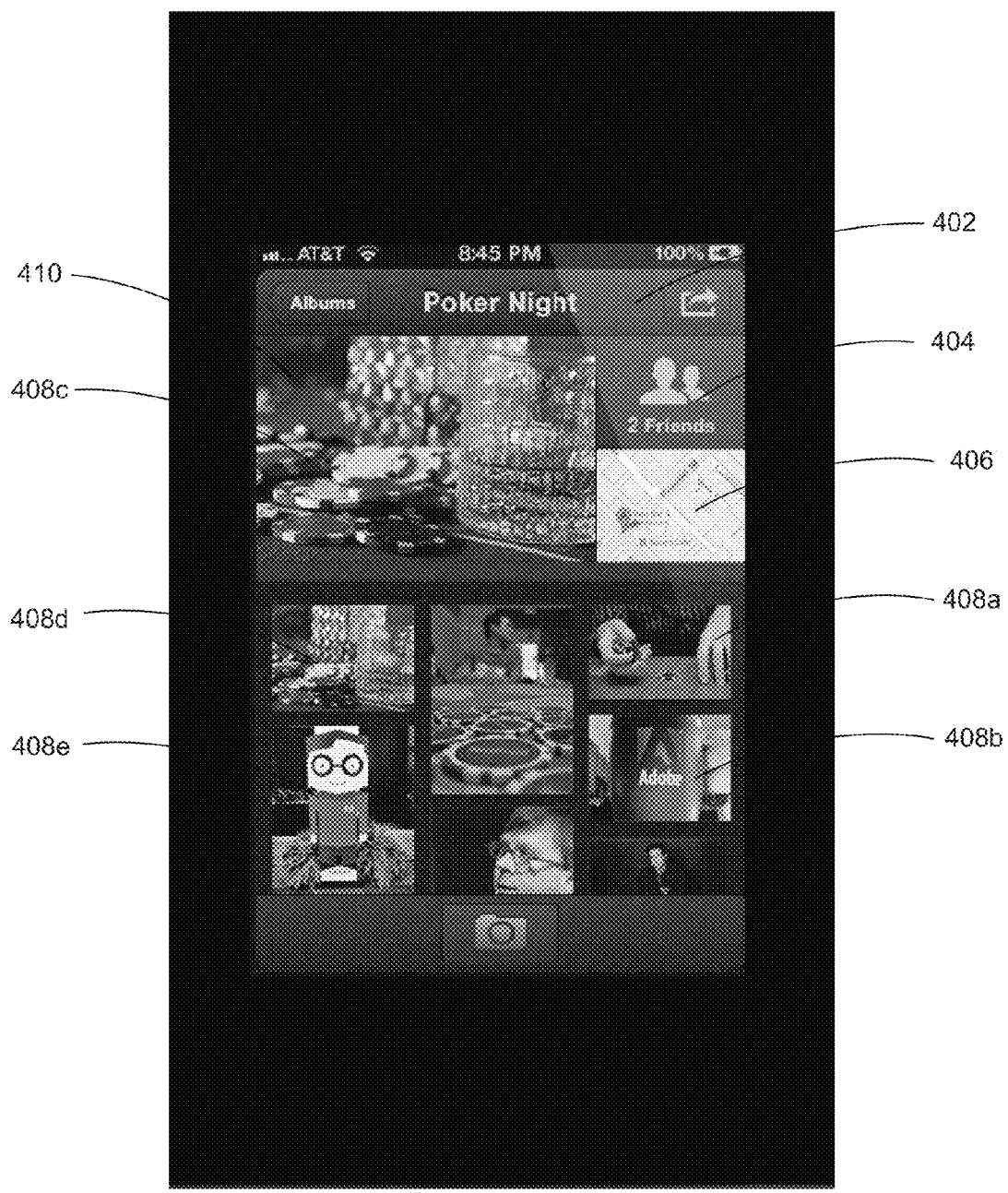
FIG. 4 is an illustration depicting an exemplary user interface for a content sharing application.

FIG. 4 is an illustration depicting an exemplary user interface for a content sharing application. As illustrated in FIG. 4, the user interface 410 may be a user interface of the content sharing application. The user interface may be shown on a display of a mobile device 402 associated with a user. The user interface 410 may include a visual representation of the electronic content captured 408a-408e by the user. For example, the visual representation may show all the electronic content captured by the user when the user is within the live event vicinity. The user interface 410 may also include a map 406 that indicates the current location of the user. The map 406 may indicate the live event vicinity. The user may interact with the map 406 to define a live event vicinity.

Figure 5:
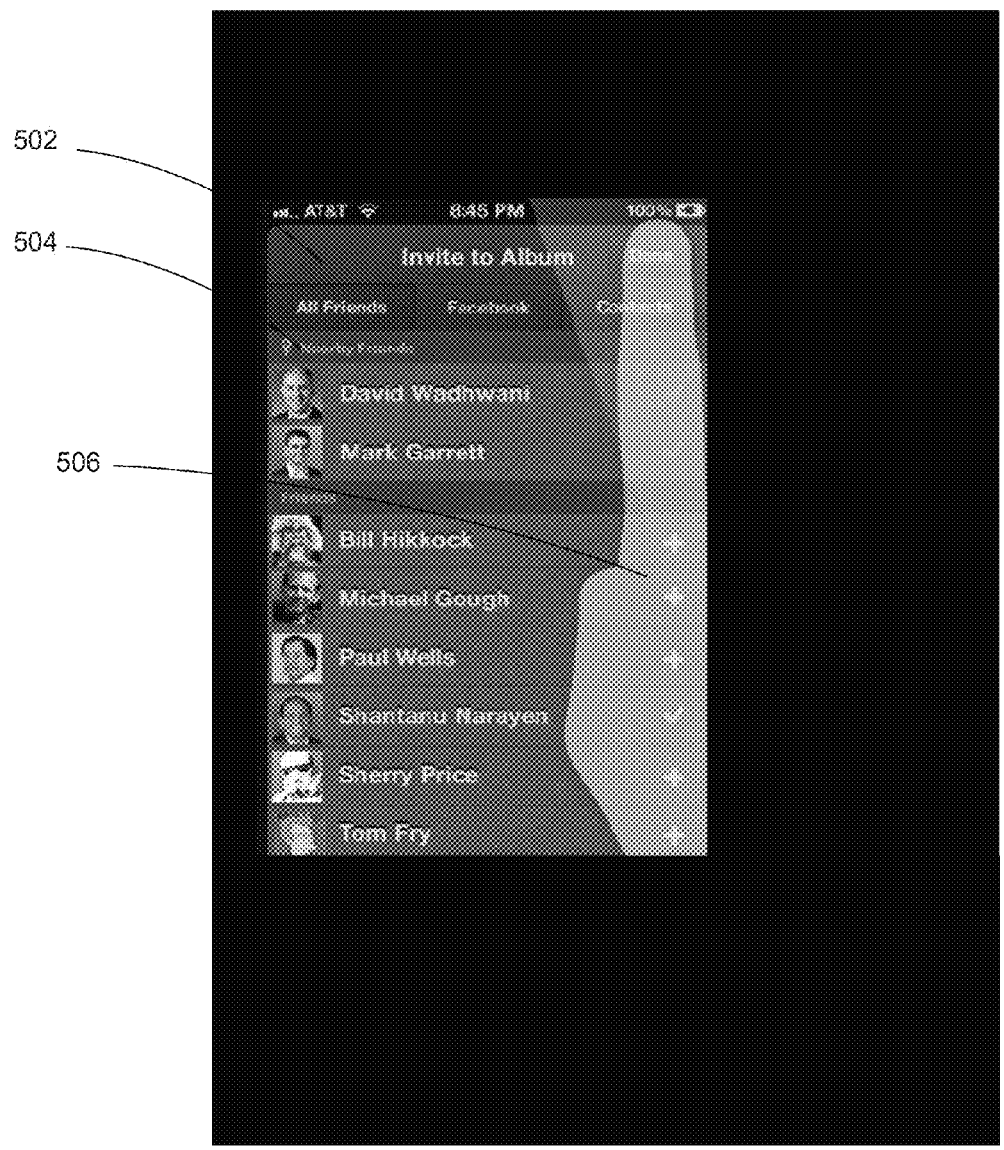
FIG. 5 is an illustration depicting an exemplary user interface for a content sharing application.

The user interface 410 may include a social contact indicator 404. The social contact indicator 404 may indicate that one or more social contacts are within a live event vicinity. For example, FIG. 4 illustrates that 2 friends of the user are within a live event vicinity. In some embodiments, the one or more social contacts within the live event vicinity will receive electronic content captured by the user. In another embodiments, the mobile device user may depress the social contact indicator 404 on the mobile device 402 and be directed to another user interface screen that gives the user the opportunity to select the one or more social contacts that are capable of receiving captured electronic content. FIG. 5 illustrates such a user interface screen. The user 506 is given the ability to select from a list of social contacts 504 within the live event vicinity to determine whether those contacts will receive captured electronic content.

Figure 6:
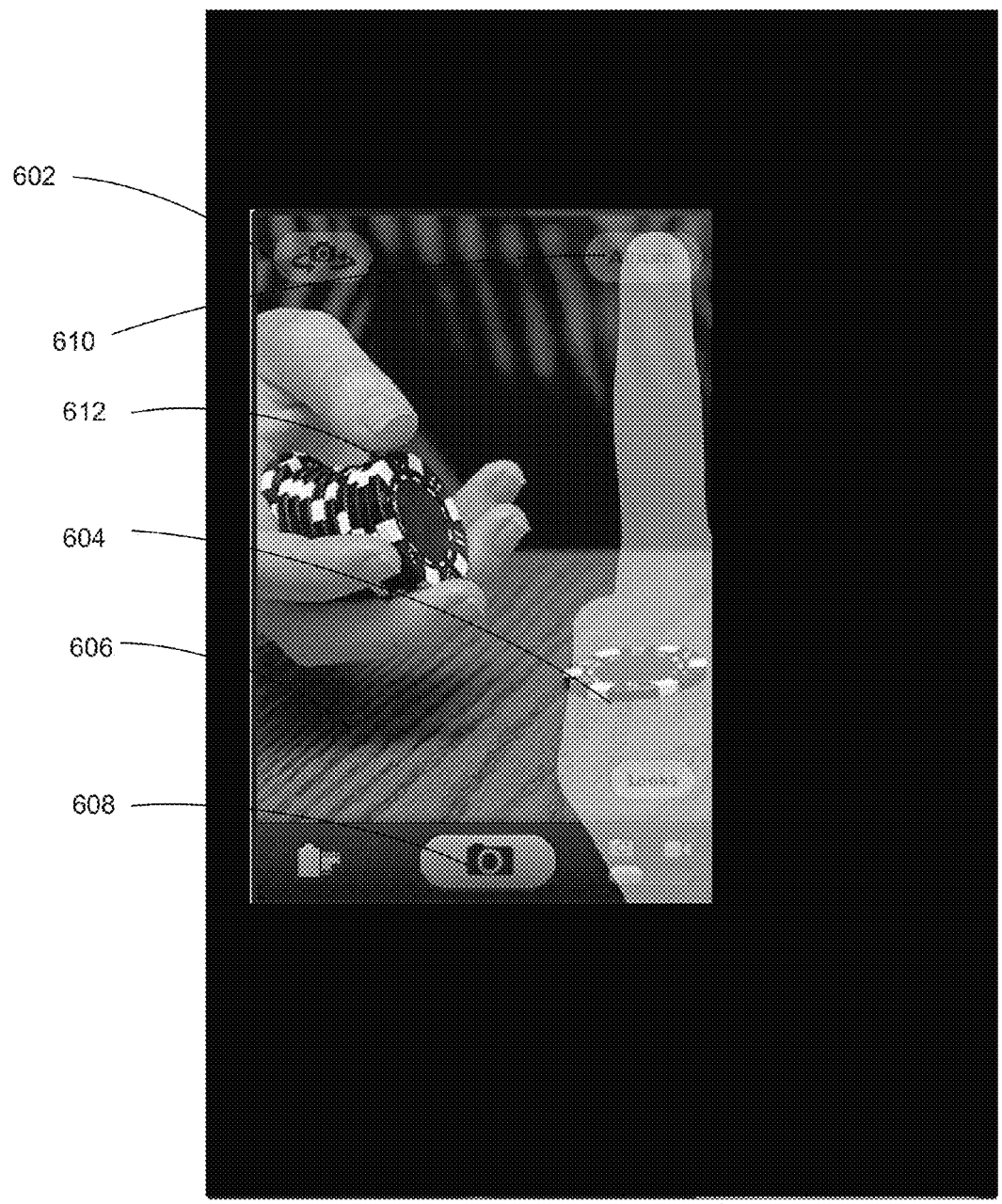
FIG. 6 is an illustration depicting an exemplary user interface for a content sharing application.

FIG. 6 illustrates another screen of the user interface of the content sharing application. The user interface 612 may have an electronic content capturing button 608. The user may depress the button 608 to capture electronic content 606. The user interface 612 may also have a photo album button 610. The photo album button 610 allows the user to add captured electronic content 606 to an existing photo album. The photo album button 610 may allow the user to create a new photo album that contains captured electronic content 606. Electronic content in the photo album that is captured by the user and/or social contacts of the user that are within the live event vicinity may be shared with the user and/or the social contacts of the user.

Figure 7:
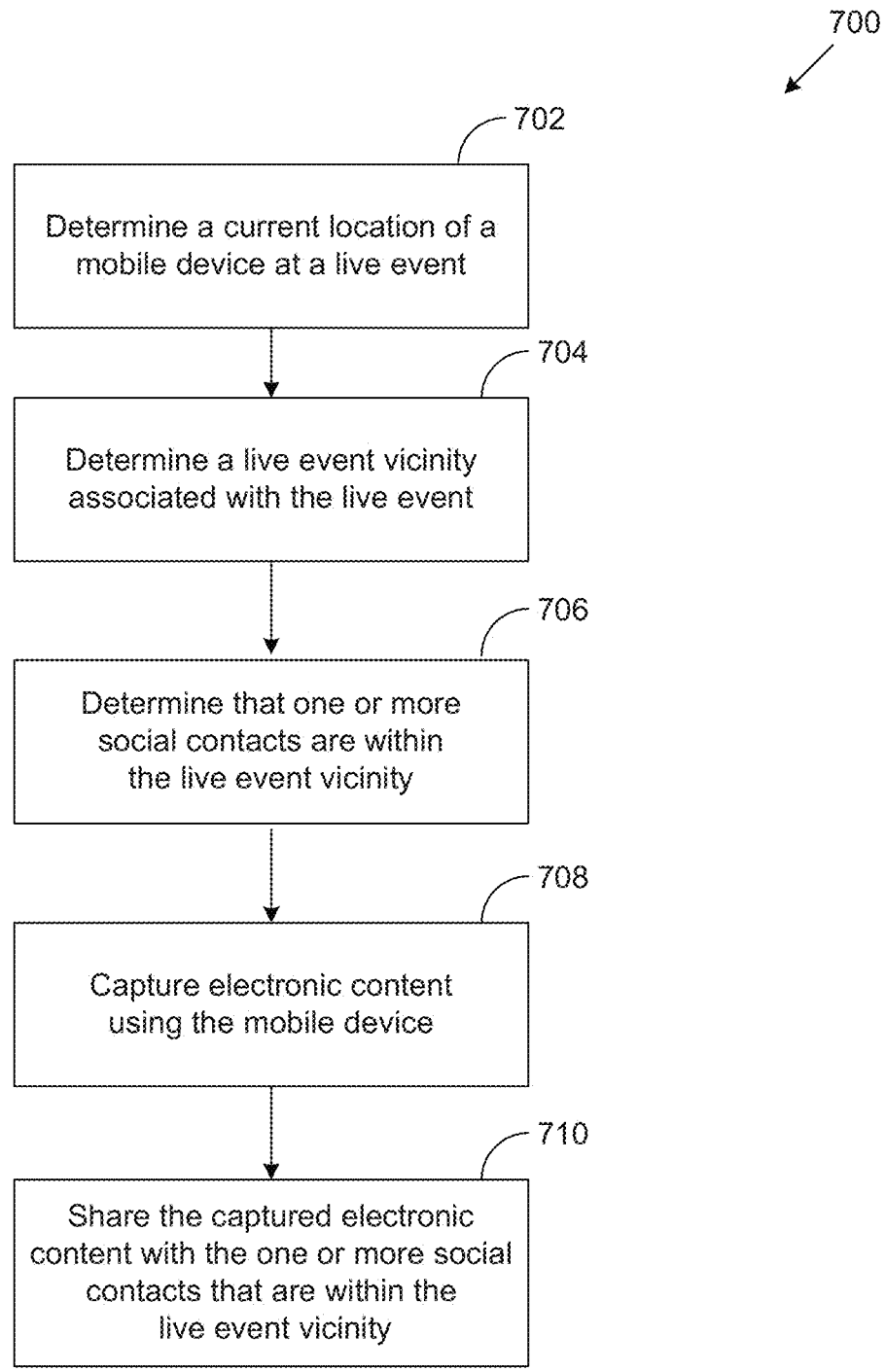
FIG. 7 is a flow chart illustrating an exemplary method of sharing real-time electronic content among social contacts.

FIG. 7 is a flow chart illustrating an exemplary method of sharing real-time content among social contacts.

At block 702, a current location of a mobile device 102 is determined. The current location of the mobile device 102 is determined at a live event. As described above, the current location of the mobile device user may be determined using GPS technology or Internet technology. The current location of the user may also be determined by tracking the users cell phone use or any other tracking use, a wireless access point, a cell phone tower, or any other mobile device tracking technology. At block 704, a live event vicinity associated with a live event is determined. The live event vicinity comprises a geographic area proximate the live event. The mobile device 102 associated with the user is within the live event vicinity. The live event vicinity may be determined by accessing the coordinates of the live event vicinity. The coordinates for a live event vicinity may be accessed by obtaining coordinates for the live event vicinity stored on one or more of the servers. The coordinates for a live event vicinity may also be accessed by the user entering the coordinates or some other representation of the location of the live event vicinity within a content sharing application of the mobile device 102.

At block 706, it is determined that one or more social contacts are within the live event vicinity. The current location of one or more social contacts may be monitored or tracked. The current location of the one or more social contacts may be compared to the live event vicinity to determine whether the one or more social contacts are within the live event vicinity. In some embodiments, the mobile device user and/or the one or more social contacts may receive an indication stating that they are within the live event vicinity.

At block 708, electronic content may be captured using the mobile device 102 associated with the user. The user may capture electronic content using the mobile device 102. For example, the user may take a photograph of a dolphin at Sea World using the mobile device. In some embodiments, the user may capture electronic content using the mobile device by depressing a button on the mobile device. In another embodiment, the user may depress a button on the user interface of a content sharing application executed on the mobile device.

At block 710, captured electronic content is shared with one or more social contacts of the user that are determined to be within the live event vicinity. The content server 112 may share captured electronic content and/or other information with one or more social contacts. In some embodiments, the distribution server 106 may share the captured electronic content with the one or more social contacts. The captured electronic content may be shared over a network 104. The captured electronic content may be shared with one or more of the user's social contacts in a variety of ways. For example, the one or more social contacts may receive the captured electronic content in a photo album on their mobile device. In some embodiments, the social contact may receive the captured electronic content in an SMS, MMS and the like.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   determining, by a processor, a current location of a mobile device at a live event, the live event comprising a gathering or occurrence involving one or more individuals;
   determining, by the processor, a live event vicinity associated with the live event and comprising a geographic area proximate the live event;
   selecting one or more social contacts to share electronic content with based on determining that the one or more social contacts are within the live event vicinity;
   capturing the electronic content using the mobile device; and
   sharing the captured electronic content with the selected one or more social contacts.

2. The method of claim 1, further comprising:
   storing the captured electronic content within an electronic photo album; and
   sharing the electronic photo album with the one or more social contacts that are determined to be within the live event vicinity.

3. The method of claim 1, wherein the captured electronic content is shared with the one or more social contacts immediately after the electronic content is captured.

4. The method of claim 1, wherein the electronic content is a photograph, video, audio recording, or a multimedia message.

5. The method of claim 1, further comprising:
   capturing electronic content using a mobile device associated with one or more social contacts; and
   sharing the captured electronic content with the mobile device and the mobile device associated with one or more social contacts that are determined to be within the live event vicinity.

6. The method of claim 1, wherein the current location of the mobile device is determined by monitoring the mobile device using a global position system.

7. The method of claim 1, wherein the live event vicinity is defined based on an input at the mobile device.

8. The method of claim 1, further comprising receiving input at the mobile device graphical user interface to define the coordinates of the live event vicinity.

9. The method of claim 1, further comprising receiving input at the mobile device graphical user interface of one or more social contacts that are capable of receiving the captured electronic content.

10. The method of claim 1 further comprising receiving user input in a content sharing application establishing the geographic area proximate the live event.

11. The method of claim 1 further comprising receiving the input of another party other than the user who captured the electronic content in a content sharing application establishing the geographic area proximate the live event.

12. A non-transitory computer-readable medium on which is encoded program code, the program code comprising:
   program code for determining a current location of a mobile device at a live event, the live event comprising a gathering or occurrence involving one or more individuals;
   program code for determining a live event vicinity associated with the live event and comprising a geographic area proximate the live event
   program code for selecting one or more social contacts to share electronic content with based on determining that the one or more social contacts are within the live event vicinity;
   program code for capturing the electronic content using the mobile device; and
   program code for sharing the captured electronic content with the selected one or more social contacts.

13. The computer-readable medium of claim 12, further comprising:
   program code for storing the captured electronic content within an electronic photo album; and
   program code for sharing the electronic photo album with the one or more social contacts that are determined to be within the live event vicinity.

14. The computer-readable medium of claim 12, wherein the captured electronic content is shared with the one or more social contacts immediately after the electronic content is captured.

15. The computer-readable medium of claim 12, wherein the electronic content is a photograph, video, audio recording, or a multimedia message.

16. The computer-readable medium of claim 12, further comprising:
program code for capturing electronic content using a mobile device associated with one or more social contacts; and
program code for sharing the captured electronic content with the mobile device and the mobile device associated with one or more social contacts that are determined to be within the live event vicinity.

17. The computer-readable medium of claim 12, further comprising program code for receiving input at the mobile device graphical user interface to define the coordinates of the live event vicinity.

18. The computer-readable medium of claim 12, further comprising program code for receiving input at the mobile device graphical user interface of one or more social contacts that are capable of receiving the captured electronic content.

19. A system comprising:
a context server configured to determine a current location of a mobile device at a live event, the live event comprising a gathering or occurrence involving one or more individuals;
an application server configured to determine a live event vicinity associated with the live event, the live event vicinity comprising a geographic area proximate the live event, and select one or more social contacts to share electronic content with based on determining that the one or more social contacts of the user are within the live event vicinity;
a content server configured to store electronic content that is captured using the mobile device;
distribution server configured to share the captured electronic content with the selected one or more social contacts.

20. The system of claim 19, wherein the application server is further configured to select the one or more social contacts.

21. The system of claim 19, wherein the content server is configured to store the captured electronic content within an electronic photo album, and the distribution server is configured to share the electronic photo album with the one or more social contacts that are determined to be within the live event vicinity.

22. The system of claim 19, wherein the content server is configured to store electronic content captured using a mobile device associated with one or more social contacts, and the distribution server is configured to share the captured electronic content with the mobile device associated and the mobile device associated with one or more social contacts that are determined to be within the live event vicinity.

* * * * *